US010403157B2

(12) United States Patent
Jacquier et al.

(10) Patent No.: US 10,403,157 B2
(45) Date of Patent: Sep. 3, 2019

(54) METHOD AND SYSTEM FOR DISPLAYING INFORMATION RELATING TO AN AIRCRAFT, DEVICE FOR PRODUCING SAID INFORMATION AND RELATED COMPUTER PROGRAM PRODUCT

(71) Applicant: THALES, Courbevoie (FR)

(72) Inventors: Vincent Jacquier, Toulouse (FR); Didier Lorido, Toulouse (FR); Florence Zambetti, Toulouse (FR)

(73) Assignee: THALES, Courbevoie (FR)

( * ) Notice: Subject to any disclaimer, the term of this patent is extended or adjusted under 35 U.S.C. 154(b) by 99 days.

(21) Appl. No.: 15/542,592

(22) PCT Filed: Jan. 13, 2016

(86) PCT No.: PCT/EP2016/050567
§ 371 (c)(1),
(2) Date: Jul. 10, 2017

(87) PCT Pub. No.: WO2016/113306
PCT Pub. Date: Jul. 21, 2016

(65) Prior Publication Data
US 2018/0005536 A1 Jan. 4, 2018

(30) Foreign Application Priority Data
Jan. 14, 2015 (FR) ..................................... 15 00072

(51) Int. Cl.
*G08G 5/00* (2006.01)
*G01C 21/00* (2006.01)

(52) U.S. Cl.
CPC ......... *G08G 5/0091* (2013.01); *G08G 5/0013* (2013.01); *G08G 5/0021* (2013.01);
(Continued)

(58) Field of Classification Search
CPC .. G08G 5/0091; G08G 5/0021; G08G 5/0013; G08G 5/0047; G08G 5/0039
See application file for complete search history.

(56) References Cited

U.S. PATENT DOCUMENTS 6,381,538 B1 4/2002 Robinson et al.
2006/0142904 A1 * 6/2006 Caillaud ................ G01C 23/00 701/3
(Continued)

FOREIGN PATENT DOCUMENTS

EP 2434469 A2 3/2012
EP 2490199 A2 8/2012
(Continued)

OTHER PUBLICATIONS

International Search Report issued for International patent application No. PCT/EP2016/050567, dated Apr. 6, 2016, 6 pages.
(Continued)

*Primary Examiner* — Thomas Ingram
(74) *Attorney, Agent, or Firm* — Duane Morris LLP

(57) ABSTRACT

This method for displaying information relative to an aircraft is carried out by computer and includes the acquisition of a message from among a meteorological message and an aeronautical information message, each message including at least one mission object identifier; searching, among the mission object identifier(s) contained in each acquired message, for at least one mission object identifier verifying at least one criterion from among first, second and third predefined criteria, the first criterion depending on a received mission plan, the second criterion depending on the current position of the aircraft, and the third criterion depending on both the current position of the aircraft and the received mission plan; and if at least one mission object identifier is detected verifying at least one of the first, second
(Continued)

and third predefined criteria, displaying each detected identifier.

16 Claims, 11 Drawing Sheets

(52) U.S. Cl.
CPC ........... *G08G 5/0052* (2013.01); *G01C 21/00* (2013.01); *G08G 5/0039* (2013.01); *G08G 5/0047* (2013.01)

(56) References Cited

U.S. PATENT DOCUMENTS

2009/0133112 A1* 5/2009 Kauffman ............ G08G 5/0013 726/11
2010/0312388 A1* 12/2010 Jang ................... G06Q 10/0631 700/248
2012/0218127 A1 8/2012 Kroen
2014/0032019 A1* 1/2014 Courteville ............ G01C 21/20 701/3
2016/0196525 A1* 7/2016 Kantor ................. G08G 5/0013 705/330
2016/0275801 A1* 9/2016 Kopardekar ......... G08G 5/0043

FOREIGN PATENT DOCUMENTS

EP 2595136 A2 5/2013
GB 2488916 A 9/2012

OTHER PUBLICATIONS

Search Report issued for patent application No. FR1500072, dated Jul. 8, 2015, 2 pages.

* cited by examiner

300

F-PLN METAR

DEPARTURE AIRPORT: LFQQ

METAR LFQQ 101030Z 30016KT 9999 BKN033 SCT066 16/08 Q1017 TEMPO 4000 SHRA BKN013TCU

DESTINATION AIRPORT: LFBZ

METAR LFBZ 101030Z 29006KT 260V320 9999 FEW008 BKN012 BKN040 18/16 Q1023 NOSIG

EN ROUTE AIRPORT: LFBI

METAR LFBI 101030Z AUTO 33008KT 300V020 9999 NSC 20/08 Q1021

EN ROUTE AIRPORT: LFBL

METAR LFBL 101030Z AUTO 33006KT 9999 NSC 16/06 Q1021

ALTERNATE AIRPORT: LEBB

METAR LEBB 101030Z 30005KT 270V010 9999 FEW012 BKN032 19/17 Q1024 NOSIG

ALTERNATE AIRPORT: LFBP

METAR LFBP 101030Z 27007KT 9999 FEW007 SCT017 BKN022 17/15 Q1022 NOSIG

ALTERNATE AIRPORT: LFBO

METAR LFBO 101030Z AUTO 26011KT 240V300 9999 FEW011 SCT048 23/12 Q1020

FIG.6

320

F-PLN TAF

DEPARTURE AIRPORT: LFOQ (ETA 23-JAN - 14:02)

TAF LFOQ 231100Z 2312/2418 26012KT 9999 NSW BKN013 TEMPO 2313/2317 26015G25KT 3000 SHRA BKN008 BKN013CB PROB30 TEMPO 2315/2317 27020G35KT BECMG 2315/2317 29013KT BKN030 BECMG 2412/2415 20005KT

DESTINATION AIRPORT: LFBZ (ETA 23-JAN - 15:24)

TAF LFBZ 231100Z 2312/2412 30010KT 9999 FEW020 BKN065 PROB40 TEMPO 2312/2318 4000 -SHRA SCT008 BKN014TCU BECMG 2402/2405 4000 -RADZ BKN005 OVC010 TEMPO 2409/2412 27015G25KT 2000 RADZ BKN003

EN ROUTE AIRPORT: LFBI (ETA 23-JAN - 14:43)

TAF LFBI 231100Z 2312/2412 24006KT CAVOK BECMG 2312/2314 5000 -RA BKN010 BECMG 2316/2318 30010KT 9999 BKN025 BECMG 2320/2322 BKN010 BECMG 2402/2404 3000 -RADZ BKN005

EN ROUTE AIRPORT: LFBL (ETA 23-JAN - 14:52)

TAF LFBL 231100Z 2312/2412 24005KT 6000 BKN004 BECMG 2312/2314 NSW BKN010 BKN020 BECMG 2314/2316 5000 -RADZ BKN006 BECMG 2318/2320 30010KT 9999 BKN010 BECMG 2403/2405 3000 -RADZ BKN003

ALTERNATE AIRPORT: LEBB (ETA 23-JAN – 15:39)

TAF LEBB 230535Z 2306/2406 28008KT 9999 SCT012 BKN030 TX14/2315Z TN06/2306Z TEMPO 2306/2312 3000 SHRA BKN025TCU TEMPO 2306/2406 3000 RA BKN012 PROB40 TEMPO 2313/2320 30015G25KT

ALTERNATE AIRPORT: LFBP (ETA 23-JAN – 15:31)

TAF LFBP 231100Z 2312/2412 23005KT 9999 SCT012 BKN025 TEMPO 2312/2321 25012KT 3000 SHRA BKN010 BKN020TCU BECMG 2321/2324 7000 RA BKN010 PROB40 TEMPO 2402/2406 4000 RA BKN006

ALTERNATE AIRPORT: LFBO (ETA 23-JAN – 16:12)

TAF LFBO 230500Z 2306/2412 28008KT 9999 BKN030 BKN050 TEMPO 2306/2312 BKN007 BKN020 TEMPO 2313/2317 SCT015 SCT050 TEMPO 2319/2412 6000 -RA BKN015 TEMPO 2320/2324 30015G25KT

FIG.8

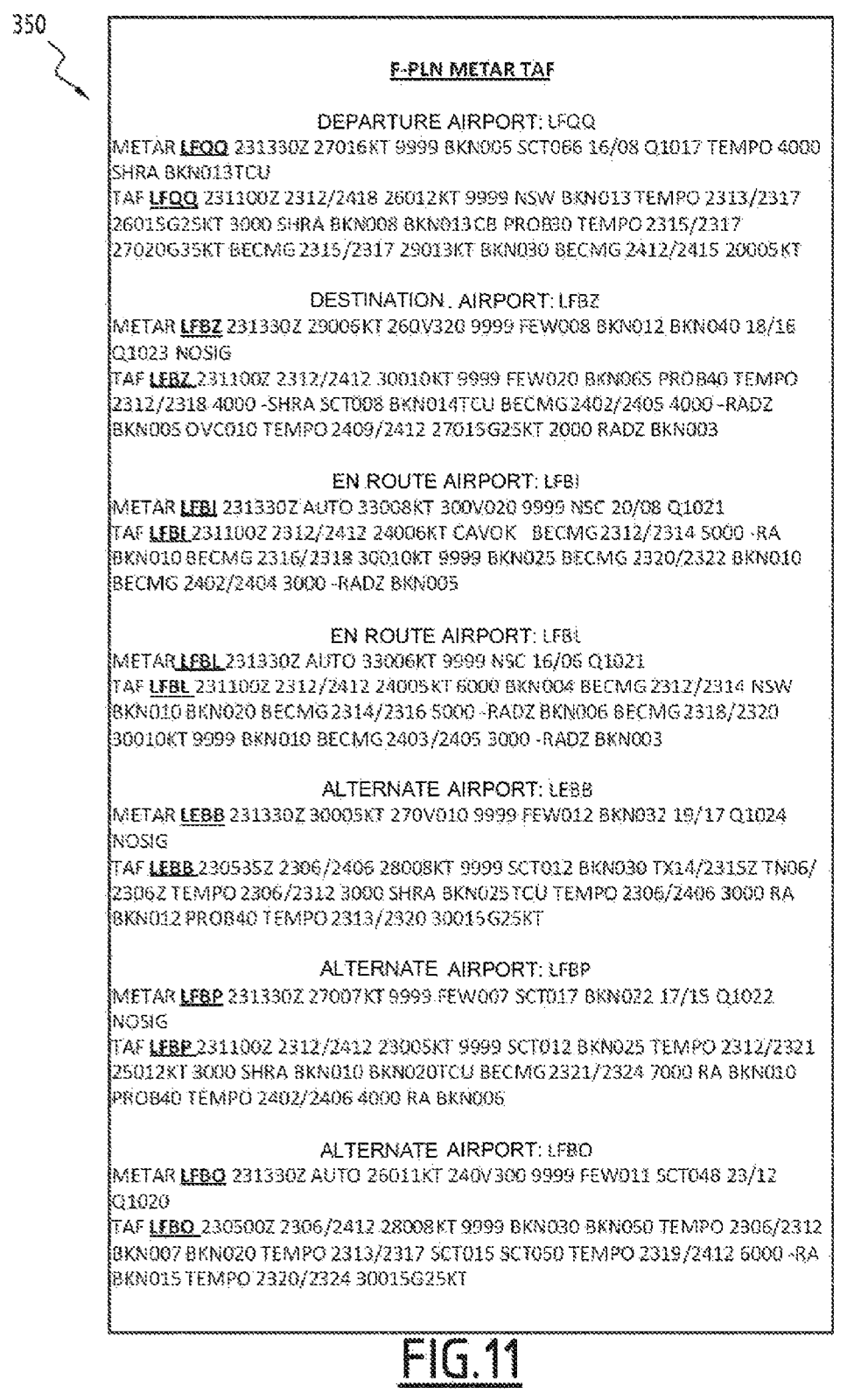

350

F-PLN METAR TAF

DEPARTURE AIRPORT: LFQQ
METAR LFQQ 231330Z 27016KT 9999 BKN005 SCT066 16/08 Q1017 TEMPO 4000 SHRA BKN013TCU
TAF LFQQ 231100Z 2312/2418 26012KT 9999 NSW BKN013 TEMPO 2313/2317 26015G25KT 3000 SHRA BKN008 BKN013CB PROB30 TEMPO 2315/2317 27020G35KT BECMG 2315/2317 29013KT BKN030 BECMG 2412/2415 20005KT

DESTINATION . AIRPORT: LFBZ
METAR LFBZ 231330Z 29006KT 260V320 9999 FEW008 BKN012 BKN040 18/16 Q1023 NOSIG
TAF LFBZ 231100Z 2312/2412 30010KT 9999 FEW020 BKN065 PROB40 TEMPO 2312/2318 4000 -SHRA SCT008 BKN014TCU BECMG 2402/2405 4000 -RADZ BKN005 OVC010 TEMPO 2409/2412 27015G25KT 2000 RADZ BKN003

EN ROUTE AIRPORT: LFBI
METAR LFBI 231330Z AUTO 33008KT 300V020 9999 NSC 20/08 Q1021
TAF LFBI 231100Z 2312/2412 24006KT CAVOK BECMG 2312/2314 5000 -RA BKN010 BECMG 2316/2318 30010KT 9999 BKN025 BECMG 2320/2322 BKN010 BECMG 2402/2404 3000 -RADZ BKN005

EN ROUTE AIRPORT: LFBL
METAR LFBL 231330Z AUTO 33006KT 9999 NSC 16/06 Q1021
TAF LFBL 231100Z 2312/2412 24005KT 6000 BKN004 BECMG 2312/2314 NSW BKN010 BKN020 BECMG 2314/2316 5000 -RADZ BKN006 BECMG 2318/2320 30010KT 9999 BKN010 BECMG 2403/2405 3000 -RADZ BKN003

ALTERNATE AIRPORT: LEBB
METAR LEBB 231330Z 30005KT 270V010 9999 FEW012 BKN032 19/17 Q1024 NOSIG
TAF LEBB 230535Z 2306/2406 28008KT 9999 SCT012 BKN030 TX14/2315Z TN06/2306Z TEMPO 2306/2312 3000 SHRA BKN025TCU TEMPO 2306/2406 3000 RA BKN012 PROB40 TEMPO 2313/2320 30015G25KT

ALTERNATE AIRPORT: LFBP
METAR LFBP 231330Z 27007KT 9999 FEW007 SCT017 BKN022 17/15 Q1022 NOSIG
TAF LFBP 231100Z 2312/2412 23005KT 9999 SCT012 BKN025 TEMPO 2312/2321 25012KT 3000 SHRA BKN010 BKN020TCU BECMG 2321/2324 7000 RA BKN010 PROB40 TEMPO 2402/2406 4000 RA BKN005

ALTERNATE AIRPORT: LFBO
METAR LFBO 231330Z AUTO 26011KT 240V300 9999 FEW011 SCT048 23/12 Q1020
TAF LFBO 230500Z 2306/2412 28008KT 9999 BKN030 BKN050 TEMPO 2306/2312 BKN007 BKN020 TEMPO 2313/2317 SCT015 SCT050 TEMPO 2319/2412 6000 -RA BKN015 TEMPO 2320/2324 30015G25KT

FIG.11

360

F-PLN METAR TAF

DEPARTURE AIRPORT: LFQQ (ETA 23-JAN - 14:02)
METAR LEQQ 231330Z 30016KT 9999 BKN033 SCT066 16/08 Q1017 TEMPO 4000 SHRA BKN013TCU
TAF LFQQ 231100Z 2312/2418 26012KT 9999 NSW BKN013 TEMPO 2313/2317 26015G25KT 3000 SHRA BKN008 BKN013CB PROB30 TEMPO 2315/2317 27020G35KT BECMG 2315/2317 29013KT BKN030 BECMG 2412/2415 20005KT

DESTINATION AIRPORT: LFBZ (ETA 23-JAN - 15:24)
METAR LFB2 231330Z 29006KT 260V320 9999 FEW008 BKN012 BKN040 18/16 Q1023 NOSIG
TAF LFBZ 231100Z 2312/2412 30010KT 9999 FEW020 BKN065 PROB40 TEMPO 2312/2318 4000 -SHRA SCT008 BKN014TCU BECMG 2402/2405 4000 -RADZ BKN005 OVC010 TEMPO 2409/2412 27015G25KT 2000 RADZ BKN003

EN ROUTE AIRPORT: LFBI (ETA 23-JAN - 14:43)
METAR LFBI 231330Z AUTO 33008KT 300V020 9999 NSC 20/08 Q1021
TAF LFBI 231100Z 2312/2412 24006KT CAVOK BECMG 2312/2314 5000 -RA BKN010 BECMG 2316/2318 30010KT 9999 BKN025 BECMG 2320/2322 BKN010 BECMG 2402/2404 3000 -RADZ BKN005

EN ROUTE AIRPORT: LFBL (ETA 23-JAN - 14:52)
METAR LFBL 231330Z AUTO 33006KT 9999 NSC 16/06 Q1021
TAF LFBL 231100Z 2312/2412 24005KT 6000 BKN004 BECMG 2312/2314 NSW BKN010 BKN020 BECMG 2314/2316 5000 -RADZ BKN006 BECMG 2318/2320 30010KT 9999 BKN010 BECMG 2403/2405 3000 -RADZ BKN003

ALTERNATE AIRPORT: LEBB (ETA 23-JAN – 15:39)
METAR LEBB 231330Z 30005KT 270V010 9999 FEW012 BKN032 19/17 Q1024 NOSIG
TAF LEBB 230535Z 2306/2406 28008KT 9999 SCT012 BKN030 TX14/2315Z TN06/2306Z TEMPO 2306/2312 3000 SHRA BKN025TCU TEMPO 2306/2406 3000 RA BKN012 PROB40 TEMPO 2313/2320 30015G25KT

ALTERNATE AIRPORT: LFBP (ETA 23-JAN – 15:31)
METAR LFBP 231330Z 27007KT 9999 FEW007 SCT017 BKN022 17/15 Q1022 NOSIG
TAF LFBP 231100Z 2312/2412 23005KT 9999 SCT012 BKN025 TEMPO 2312/2321 25012KT 3000 SHRA BKN010 BKN020TCU BECMG 2321/2324 7000 RA BKN010 PROB40 TEMPO 2402/2406 4000 RA BKN006

ALTERNATE AIRPORT: LFBO (ETA 23-JAN – 16:12)
METAR LFBO 231330Z AUTO 26011KT 240V300 9999 FEW011 SCT048 23/12 Q1020
TAF LFBO 230500Z 2306/2412 28008KT 9999 BKN030 BKN050 TEMPO 2306/2312 BKN007 BKN020 TEMPO 2313/2317 SCT015 SCT050 TEMPO 2319/2412 6000 -RA BKN015 TEMPO 2320/2324 30015G25KT

FIG. 12

METHOD AND SYSTEM FOR DISPLAYING INFORMATION RELATING TO AN AIRCRAFT, DEVICE FOR PRODUCING SAID INFORMATION AND RELATED COMPUTER PROGRAM PRODUCT

CROSS-REFERENCE TO RELATED APPLICATIONS

The present application is a United States national stage application under 35 U.S.C. § 371 of international patent application number PCT/EP2016/050567, filed Jan. 13, 2016, which claims priority to French patent application no. 1500072, filed Jan. 14, 2015, the entireties of which are incorporated herein by reference.

FIELD OF THE INVENTION

The present invention relates to a method for displaying information relative to an aircraft, the method being implemented by a computer.

The invention also relates to a related electronic developing device for developing information relative to the aircraft.

The invention also relates to an information display system comprising such a developing device for developing said information and a display module for displaying said developed information.

The invention relates to the field of systems, preferably onboard systems, to aid air navigation, relating to the management of aeronautic and meteorological information, also called AIS-MET (Aeronautical Information Services-METeorology), intended for users responsible for conducting aircraft, whether they are on board or outside the aircraft.

BACKGROUND OF THE INVENTION

The current systems to aid air navigation generally present raw and complete AIS-MET information in the form of successive messages. Next, the user interprets and mentally filters this received information, based on the situation of the aircraft, so as only to take the relevant data from among the received messages into account.

As an example, the crew of an aircraft receives weather bulletins through an ACARS system (Aircraft Communication Addressing and Reporting System), or by voice transmission if the aircraft is not equipped with the corresponding data link. The crew then prints and analyzes them to assess the current and future meteorological situation of the aircraft.

However, this task constitutes a substantial workload for the user, and involves a relatively long time frame to analyze this AIS-MET information received in the form of successive messages. This task is also fairly tedious and repetitive when the received quantity of data is significant, which further creates a risk of error for the user.

SUMMARY OF THE INVENTION

The aim of the invention is then to propose a method and system for displaying information relative to an aircraft, making it possible to facilitate the analysis of a received message from among a meteorological message and an aeronautical information message, such as a message of the AIS-MET type.

To that end, the invention relates to a method for displaying information relative to an aircraft, the method being implemented by a computer and including the following steps:

- acquiring at least one message from among a meteorological message and an aeronautical information message, each message including at least one mission object identifier;
- searching, among the mission object identifier(s) contained in each acquired message, for at least one mission object identifier verifying at least one criterion from among first, second and third predefined criteria, the first criterion depending on a received mission plan, the second criterion depending on the current position of the aircraft, and the third criterion depending on both the current position of the aircraft and the received mission plan; and
- if at least one mission object identifier is detected verifying at least one of the first, second and third predefined criteria, displaying each detected mission object identifier.

The method according to the invention makes it possible to provide assistance to the user in analyzing a received message, such as an AIS-MET message, by filtering and highlighting the relevant data for his mission, taking into account the mission plan and/or the position of the aircraft associated with a correlation with the received aeronautical and/or meteorological information. The method according to the invention thus makes the user's task less tedious, and allows him to perform his subsequent analysis task of the received message more quickly, while decreasing the risk of user error.

Thus, the method according to the invention makes it possible to correlate acquired aeronautical and/or meteorological information with the mission plan of the aircraft, also called flight plan, and/or with the position of the aircraft, then to display the correlated information.

According to other advantageous aspects of the invention, the display method comprises one or more of the following features, considered alone or according to all technically possible combinations:

- each meteorological message is chosen from among the group consisting of: a METAR message, a SPECI message, a TAF message, a PIREP message, a SIGMET message, an AIRMET message and a VOLMET message;
- each aeronautical message is chosen from among the group consisting of: an ATIS message, a NOTAM message, a SNOWTAM message and an ASHTAM message;
- each mission object identifier is according to document ICAO 7910;
- each mission object used for the search step is chosen from among an airport and an airspace zone;
- the received mission plan includes mission objects, each mission object having an associated identifier; and during the search step, the first predefined criterion is the inclusion of the searched mission object identifier both in the acquired message and in the received mission plan;
- during the display step, each detected mission object identifier is displayed, in the corresponding message, separately relative to the other mission object identifier(s) potentially displayed;
- each information message includes at least one time range and the mission plan includes time moments, the search step further includes the search, for each acquired information message, for at least one time range containing, with a predefined margin of error, at least one of the time moments contained in the received mission plan, and the display step further including the display of each detected time range;

during the search step, the second predefined criterion is the positioning of the mission object associated with the searched identifier within a cylindrical volume around the current position of the aircraft, the cylindrical volume extending vertically;

the search according to the second predefined criterion is done only among the acquired meteorological message(s) containing observed meteorological information, each meteorological message preferably being chosen from among a METAR message and a SPECI message;

the method further comprises calculating, from the received mission plan, an estimated trajectory of the aircraft from its current position, and during the search step, the third predefined criterion is the position of the mission object associated with the searched identifier within at least one cylinder positioned around at least one portion of the estimated trajectory of the aircraft from its current position;

the search according to the third predefined criterion is done only among the acquired meteorological message(s) containing estimated meteorological information, each meteorological message preferably being chosen from among a TAF message and a VOLMET message.

The invention also relates to a non-transitory computer-readable medium comprising a computer program product comprising software set points which, when implemented by a computer, carry out a generation method as defined above.

The invention also relates to an electronic developing device for developing information relative to an aircraft, comprising:

a module for acquiring at least one message from among a meteorological message and an aeronautical information message, each message including at least one mission object identifier;

a module for searching, among the mission object identifier(s) contained in each acquired message, for at least one mission object identifier verifying at least one criterion from among first, second and third predefined criteria, the first criterion depending on a received mission plan, the second criterion depending on the current position of the aircraft, and the third criterion depending on both the current position of the aircraft and the received mission plan; and a module for developing, if at least one mission object identifier is detected verifying at least one of the first, second and third predefined criteria, an information message including each detected mission object identifier.

The invention also relates to a system for displaying information relative to an aircraft, comprising an electronic developing device for developing said information relative to the aircraft and a display module for displaying said developed information, wherein the electronic developing device is as defined above.

BRIEF DESCRIPTION OF THE DRAWINGS

These features and advantages of the invention will appear upon reading the following description, provided solely as a non-limiting example, and done in reference to the appended drawings, in which:

FIGS. 6 to 12 are views of information displayed according to a second embodiment, the search criterion according to the second embodiment being the inclusion of the searched mission object identifier both in the acquired message and any received mission plan.

DETAILED DESCRIPTION OF PREFERRED EMBODIMENTS

Figure 1:
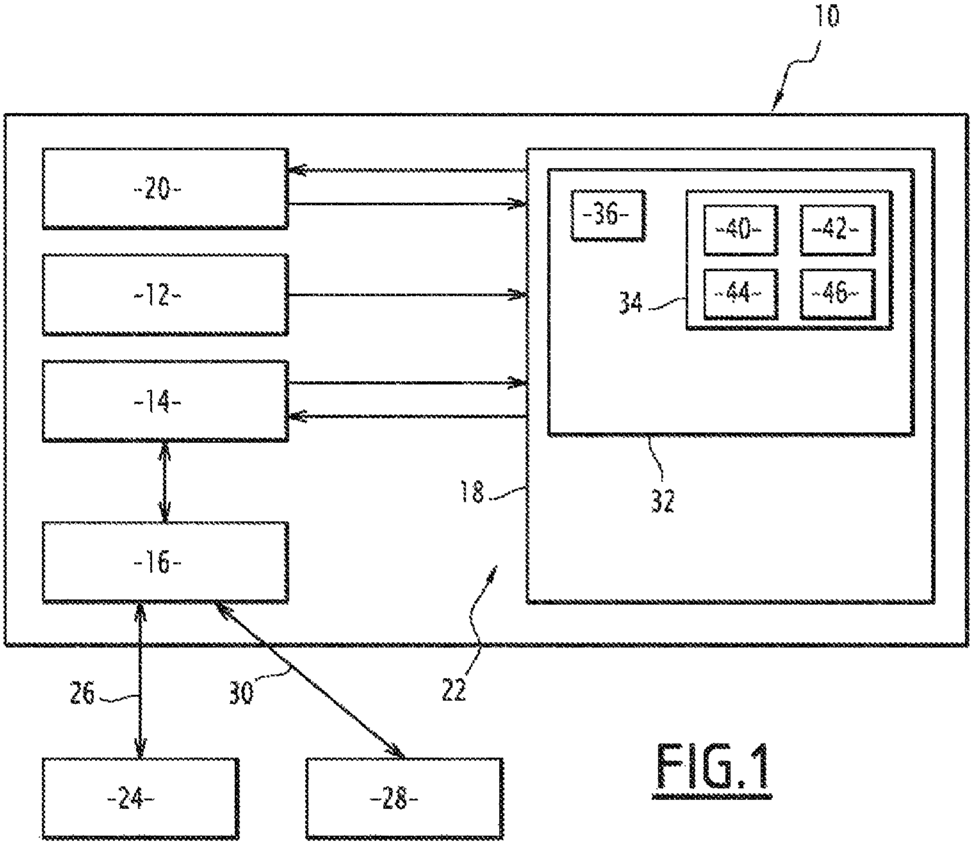
FIG. 1 is a schematic illustration of an aircraft including an avionics systems, including a system for displaying information relative to the aircraft, the aircraft communicating with systems on the ground, the information display system including a device for developing said information so that it may be displayed and a module for displaying the developed information.

In FIG. 1, an aircraft 10 comprises a flight management system (FMS) 12 of the aircraft, a communication system 14 and one or several radio transceivers 16 connected to the communication system 14.

The aircraft 10 comprises an electronic developing device 18 for developing information relative to the aircraft and a display module 20 for displaying said developed information, the developing device 18 and the display module 20 forming a system 22 for displaying said information relative to the aircraft, The aircraft 10 is for example an airplane. Alternatively, the aircraft 10 is a rotary wing aircraft, such as a helicopter or any other aerial vehicle.

The aircraft 10 is configured to communicate, via its radio transceivers 16, with electronic systems on the ground, such as one or several systems 24 for forecasting meteorological information via a first radio link 26, or such as one or several systems 28 for transmitting aeronautical information via a second radio link 30.

The flight management system 12 is for example connected to a plurality of measuring members, not shown and known in themselves, such as an inertial reference including accelerometers and gyroscopes, a radio altimeter, a geolocation system. The flight management system 12 is able to determine the position, attitude and future trajectory of the aircraft 10 and to estimate different properties, such as the altitude, speed, from measurements taken by the measuring members.

The flight management system 12 includes a memory, not shown, capable of storing a flight plan of the aircraft 10, also called mission plan. The mission plan includes mission objects, such as an airport or an airspace zone.

The communication system 14 is known per se, and is configured to communicate, via the radio transceivers 16, with the electronic systems on the ground, such as systems for broadcasting meteorological information 24 and systems for transmitting aeronautical information 28.

The communication system 14 includes a digital part, not shown, for communication with digital data links, and an audio part, not shown, for voice communication.

Each radio transceiver 16 is known per se, and is suitable for transmitting and/or receiving radio signals, in particular to and/or from electronic systems 24, 28 based on the ground, both by voice communication and data link.

The electronic developing device 18 includes a processing unit 32, for example formed by a memory 34 and a processor 36 associated with the memory 34.

The display module 20 includes a display screen, not shown, intended in particular to display the information supplied by the developing device 18, this screen for example being the screen of another avionics system.

Each system for broadcasting meteorological information 24 is known per se. The system for broadcasting meteorological information 24 for example supports a METAR (METeorological Aerodrome Report) service, which provides meteorological observation reports in airport zones. The METAR system is configured to broadcast a METAR message every hour (or half hour) at a set time. The METAR message, known per se, for example includes a trend forecast (suffix TEND or TREND) for the two hours following the observation regarding significant changes, on wind, visibility, weather present and significant clouds.

Additionally or alternatively, the system for broadcasting meteorological information 24 supports a SPECI service, which also provides meteorological observation reports in airport zones. The SPECI system is configured to broadcast a SPECI message, outside transmission periods for METAR messages. As is known per se, the SPECI message is developed upon a worsening (M) or an improvement (B) of certain meteorological parameters.

The METAR and SPECI text messages are written in accordance with the rules of appendix 11 of the ICAO (International Civil Aviation Organization), also called OACI (Organisation de l'Aviation Civile Internationale).

Additionally or alternatively, the system for broadcasting meteorological information 24 supports a TAF (Terminal Aerodrome Forecast) service, which also provides meteorological forecast reports in airport zones. The TAF system is configured to broadcast a single type of TAF message per aerodrome: either a short TAF message with forecast in 9 hours, or a long TAF message with forecast in 24 hours or 30 hours. The short TAF messages are transmitted from 0 h UTC every 3 hours, and the long TAF messages are transmitted from 0 h UTC every 6 hours.

Additionally or alternatively, the system for broadcasting meteorological information 24 supports a SIGMET (SIGnificant METeorological information) system that provides meteorological alert bulletins, the purpose of which is to warn pilots of a significant weather phenomenon on their route that may affect the safety of the flight. The SIGMET system is configured to broadcast a SIGMET message no later than 4 hours before the forecast time of the phenomenon (with an exception for volcanic clouds), and to then provide a 4 hours prediction.

Additionally or alternatively, the system for broadcasting meteorological information 24 supports a AIRMET system that provides meteorological alert bulletins, the purpose of which is to warn pilots of a significant weather phenomenon below the FL100. The AIRMET system is configured to broadcast a AIRMET message no later than 4 hours before the forecast time of the phenomenon (with an exception for volcanic clouds), and to then provide a 4 hours prediction.

The SIGMET, AIRMET messages are defined in the form of voice messages on the aeronautic radio frequencies and/or in the form of digital messages via corresponding digital data links.

Additionally or alternatively, the system for broadcasting meteorological information 24 supports a DVOLMET service, which is configured to broadcast one or more VOLMET messages. The DVOLMET service is a digital meteorological information service for an aircraft in flight. According to appendix 3 of the ICAO, the VOUVIET broadcast is a provision of current routines and special reports in the METAR format, SPECI, aerodrome forecasts in the TAF format, and aeronautical meteorological alerts (SIGMET), using continuous and repeated voice transmissions.

Each meteorological message is then chosen from among the group consisting of: a METAR message, a SPECI message, a TAF message, a SIGMET message, an AIRMET message and a VOLMET message.

Each system for transmitting aeronautical information 28 is known per se. The system for transmitting aeronautical information 28 for example supports an ATIS service that automatically distributes information on the airport terminal zone. The ATIS system is configured to broadcast an ATIS message in the form of a voice message on the aeronautical radio frequencies and/or in the form of a digital message via a corresponding data link. The ATIS message is according to the rules of appendix 11 of the ICAO.

Additionally or alternatively, the system for transmitting aeronautical information 28 supports a system for transmitting specific aeronautical messages, configured to broadcast a NOTAM (NOTice to AirMen) message, a SNOWTAM message, or an ASHTAM message, for example in case of runway notification(s), circulation paths, firewall with risk or presence of snow, ice and/or standing water (SNOWTAM), or in case of notification(s) regarding a change of volcanic activity that is significant for operations, a volcanic eruption and/or a cloud of volcanic ash (ASHTAM message). The transmission of the NOTAM, SNOWTAM and ASHTAM messages is according to chapter 5 of appendix 15 of the ICAO.

Each aeronautical information message is then chosen from among the group consisting of: an ATIS message, a NOTAM message, a SNOWTAM message and an ASHTAM message.

Each meteorological message and each aeronautical information message includes at least one mission object identifier, each mission object preferably being an airport or an airspace zone. One skilled in the art will understand that, according to the invention, the airport broadly refers to any location referenced with the ICAO, allowing the takeoff or landing of the aircraft 10, and therefore if applicable also refers to an aerodrome, such as a heliport, or any takeoff and landing site for aircraft, such as for drones.

The METAR, SPECI, TAF, SIGMET, AIRMET, VOLMET, NOTAM, SNOWTAM and ASHTAM messages are text messages. In other words, the METAR, SPECI, TAF, SIGMET, AIRMET, VOLMET, NOTAM, SNOWTAM and ASHTAM messages each comprise a set of alphanumeric characters. The formatting of these text messages is compliant with the rules dictated by the ICAO for aeronautical services.

Each mission object identifier is according to document ICAO 7910. Each mission object identifier is then preferably in the form of a 4-letter code, i.e., made up of 4 alphabetical characters, as shown in FIGS. 3 to 12.

The memory 34 includes software 40 for acquiring at least one message from among a meteorological message and an aeronautical information message, and software 42 for receiving a mission plan.

The memory 34 includes software 44 for searching, among the mission object identifier(s) contained in each acquired message, for at least one mission object identifier verifying at least one criterion from among first, second and third predefined criteria. The first criterion depends on a received mission plan. The second criterion depends on a current position of the aircraft 10, and the third criterion depends on both the current position of the aircraft 10 and the received mission plan.

The memory 34 includes software 46 for developing, if at least one mission object identifier is detected verifying at least one of the first, second and third predefined criteria, an information message including each detected mission object identifier. The information message is next intended in particular to be displayed by the display module 20.

The processor 36 is configured to allow each software 40, 42, 44 and, 46 to be run.

When run by the processor 36, the acquisition software 40, the reception software 42, the search software 44 and the developing software 46, respectively, form an acquisition module, a reception module, a search module and a developing module, respectively.

Alternatively, the acquisition module 40, the reception module 42, the search module 44 and the developing module 46 are made in the form of programmable logic components, or in the form of dedicated integrated circuits.

The acquisition module 40 is configured to acquire at least one message from among a meteorological message and an aeronautical information message, the meteorological message preferably being chosen from among the group consisting of: a METAR message, a SPECI message, a TAF message, a SIGMET message, an AIRMET message and a VOLMET message; and the aeronautical information message preferably being chosen from among the group consisting of: an ATIS message, a NOTAM message, a SNOWTAM message and an ASHTAM message.

The acquisition module 40 is for example configured to acquire the set of messages broadcast continuously from meteorological 24 and aeronautical information 28 systems, situated within radio communication range of the aircraft 10.

Additionally or alternatively, the acquisition module 40 is configured from types of messages chosen by the crew or predefined from among the aforementioned message types, and from mission object identifiers contained in the mission plan, to send a request to the meteorological 24 and aeronautical information 28 systems, the latter next returning the message(s) corresponding to the request.

The reception module 42 is configured to receive the mission plan of the aircraft 10.

The reception module 42 is for example configured to receive the mission plan from the flight management system 12.

Alternatively, the reception module 42 is configured to receive the mission plan from an air traffic control system or from a flight management system of the airline associated with the aircraft 10 via a network of the ACARS or ATN type.

Also alternatively, the reception module 42 is configured to recover the mission plan from a database of predefined mission plans, not shown, for example stored in the memory 34 of the developing device.

The search module 44 is configured to search, among the mission object identifier(s) contained in each acquired message, for at least one mission object identifier verifying at least one criterion from among the first, second and third predefined criteria. In other words, the search module 44 is suitable for detecting, in each acquired message, when any exist, one or several mission object identifiers verifying at least one of the three predefined criteria. The search module 44 then performs a correlation of each message acquired by the acquisition module 40 with at least one of the three predefined criteria.

The first criterion, as previously indicated, depends on a mission plan received by the reception module 42. The first criterion is for example the inclusion of the searched mission object identifier both in the acquired message and in the received mission plan, as will be described in detail below in light of FIGS. 6 to 12.

The second criterion depends on a current position of the aircraft. The second criterion is for example the positioning of the mission object associated with the searched identifier near the current position of the aircraft 10, as will be described in more detail below in light of FIGS. 3 to 5.

The search module 44 is preferably configured to search for the mission object identifier(s) according to the second predefined criterion is done only among the acquired meteorological message(s) containing observed meteorological information. The search module 44 is then configured to search for the mission object identifier(s) according to the second predefined criterion is done only among the METAR and SPECI messages acquired by the acquisition module 40.

The third criterion depends on both the current position of the aircraft and the received mission plan. The third criterion is for example the positioning of the mission object associated with the searched identifier near at least one portion of the estimated trajectory of the aircraft from its current position, as will also be described in more detail below in light of FIGS. 3 to 5. Each portion of the estimated trajectory of the aircraft from its current position is for example calculated by the flight management system 12, then received by the reception module 42 from the flight management system 12.

The search module 44 is preferably configured to search for the mission object identifier(s) according to the third predefined criterion is done only among the acquired meteorological message(s) containing estimated meteorological information. The search module 44 is then configured to search for the mission object identifier(s) according to the third predefined criterion is done only among the acquired TAF and VOLMET messages.

The developing module 46 is then configured to develop one or several information messages in particular containing each detected mission object identifier. The developing module 46 is further suitable for sending the display module 20 each developed information message, for displaying the detected mission object identifier(s).

The detected mission object identifier(s) are preferably displayed differently relative to any other mission object identifiers that may be displayed. The different display is for example a highlighted display, a bold display, an underlined display, or a bold and underlined display.

Figure 2:
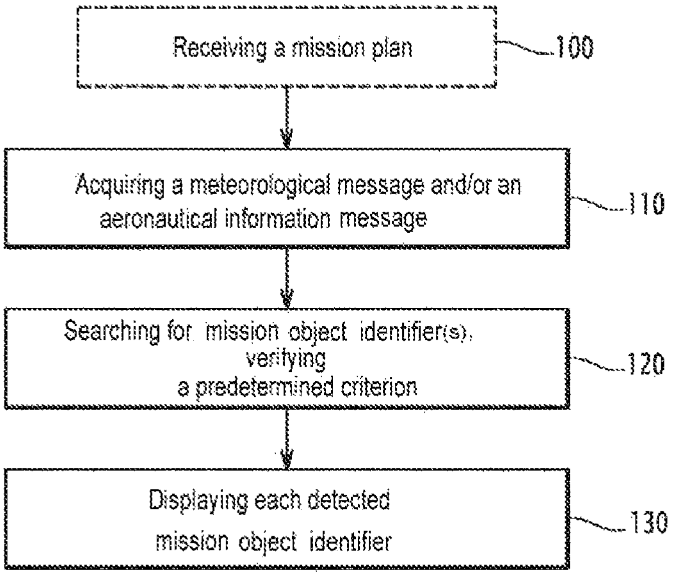
FIG. 2 is a flowchart of a method according to the invention for displaying information relative to the aircraft.

The operation of the device 18 for developing information relative to the aircraft 10 and the system 22 for displaying said information will now be explained using FIG. 2, showing a flowchart of the display method according to the invention.

During an optional initial step 100, the reception module 42 receives the mission plan for the aircraft 10 from the flight management system 12. The reception module 42 more generally receives information relative to the position and trajectory of the aircraft 10, previously calculated by the flight management system 12.

During this initial step 100, the reception module 42 for example receives the active flight plan including the waypoints near the current position of the aircraft, and the estimated arrival date at these waypoints. The reception module 42 also receives alternative waypoints and an alternative flight plan, as well as an estimated arrival date for this alternative flight plan. The reception module 42 also receives the current position of the aircraft and the current UTC date. Additionally, the reception module 42 receives navigation display parameters configured by the pilot.

The acquisition module 40 next performs, during step 110, the acquisition of at least one message from among the meteorological message(s) broadcast by the meteorological information broadcasting systems 24 within radio communication range and the aeronautical information message(s) broadcast by the aeronautical information transmission systems 28. The acquired meteorological message(s) are preferably METAR, SPECI, TAF, SIGMET, AIRMET and/or VOLMET messages. The acquired aeronautical information message(s) are preferably ATIS, NOTAM, SNOWTAM and/or ASHTAM messages.

During this acquisition step 110, as an optional addition, the acquisition module 40 deletes all of the acquired meteorological bulletins for which the validity period has expired relative to the current UTC date received during step 100. Alternatively, during this step 110, the only meteorological bulletins acquired are those having a validity period greater than the received current UTC date, i.e., still valid relative to the current UTC date.

During the following step 120, the search module 44 searches, among the mission object identifier(s) contained in each acquired message, for at least one mission object identifier verifying at least one of the first, second and third predefined criteria. As previously described, each mission object taken into account during the search step 120 is preferably an airport or an airspace zone, and each mission object identifier is then preferably an identifier with 4 alphabetical characters, according to document ICAO 7910.

During the following step 130, the developing module 46 first creates one or several information messages containing each detected mission object identifier. The developing module 46 next sends the display module 20 each created information message for displaying the detected mission object identifier(s).

During this step 130, the display module 20 displays each detected mission object identifier, differently relative to the other mission object identifiers when the latter are displayed.

As an optional addition, step 100 is reiterated to receive any modified flight plan and/or step 110 is reiterated to acquire an updated or new meteorological message or aeronautical information. If the modified flight plan is received and/or an updated meteorological message or updated aeronautical information is acquired, steps 120 and 130 are reiterated to automatically perform a new search and automatically develop an information message taking into account the changed the mission plan and/or the update to the meteorological message or aeronautical information.

The display system 22 and the display method according to the invention then give the crew of the aircraft assistance in analyzing a received meteorological or aeronautical information message, by filtering and highlighting the relevant data for his mission, taking into account the mission plan and/or the position of the aircraft. They thus make the crew's task less tedious, and allows them to perform their subsequent analysis task of the received message more quickly, while decreasing the risk of user error.

In other words, the developing device 18 makes it possible to correlate acquired aeronautical and/or meteorological information with the mission plan of the aircraft 10 and/or with the position of the aircraft. The display system 22 then makes it possible to inform the crew of the calculated correlation, by displaying the correlated information in a special manner.

The search 120 and display 130 steps will be described in more detail below, according to a first embodiment in light of FIGS. 3 to 5, then according to a second embodiment in light of FIGS. 6 to 12.

The first embodiment corresponds to the implementation, during the search step 120, of one of the second and third predefined criteria.

The first embodiment makes it possible to correlate, with the flight plan of the aircraft 10, the aeronautical and/or meteorological information in the acquired message(s), and to filter only the information associated with locations that will be relevant when flying over the flight plan. According to this first embodiment, the display system 22 then allows a global display of the filtered information on the flight plan, at the request of the crew, so as to reduce the workload for the pilots in taking meteorological conditions and/or aeronautical information affecting their flight into account.

To that end, each acquired message is automatically analyzed and filtered by the search module 44 according to at least one of the second and third predefined criteria, so as to keep only the relevant information around the sequence points of the programmed flight. As an optional addition, the missing information is automatically requested if the associated system 24, 28 is available, so as to build an even more complete display of the meteorological situation that the crew will encounter over the course of the flight. Additionally, when the acquired message is a voice message, it is also recognized and digitized by the acquisition module 40, so as to subsequently be able to be analyzed.

The developing device 18 and the display system 22 then adapt dynamically to any delay or diversion of the aircraft 10, by displaying the meteorological and/or aeronautical information according to the estimated passage time of the aircraft 10 over the zone where the meteorological conditions are observed/anticipated, thereby considerably lightning the workload of the crew.

Figure 3:
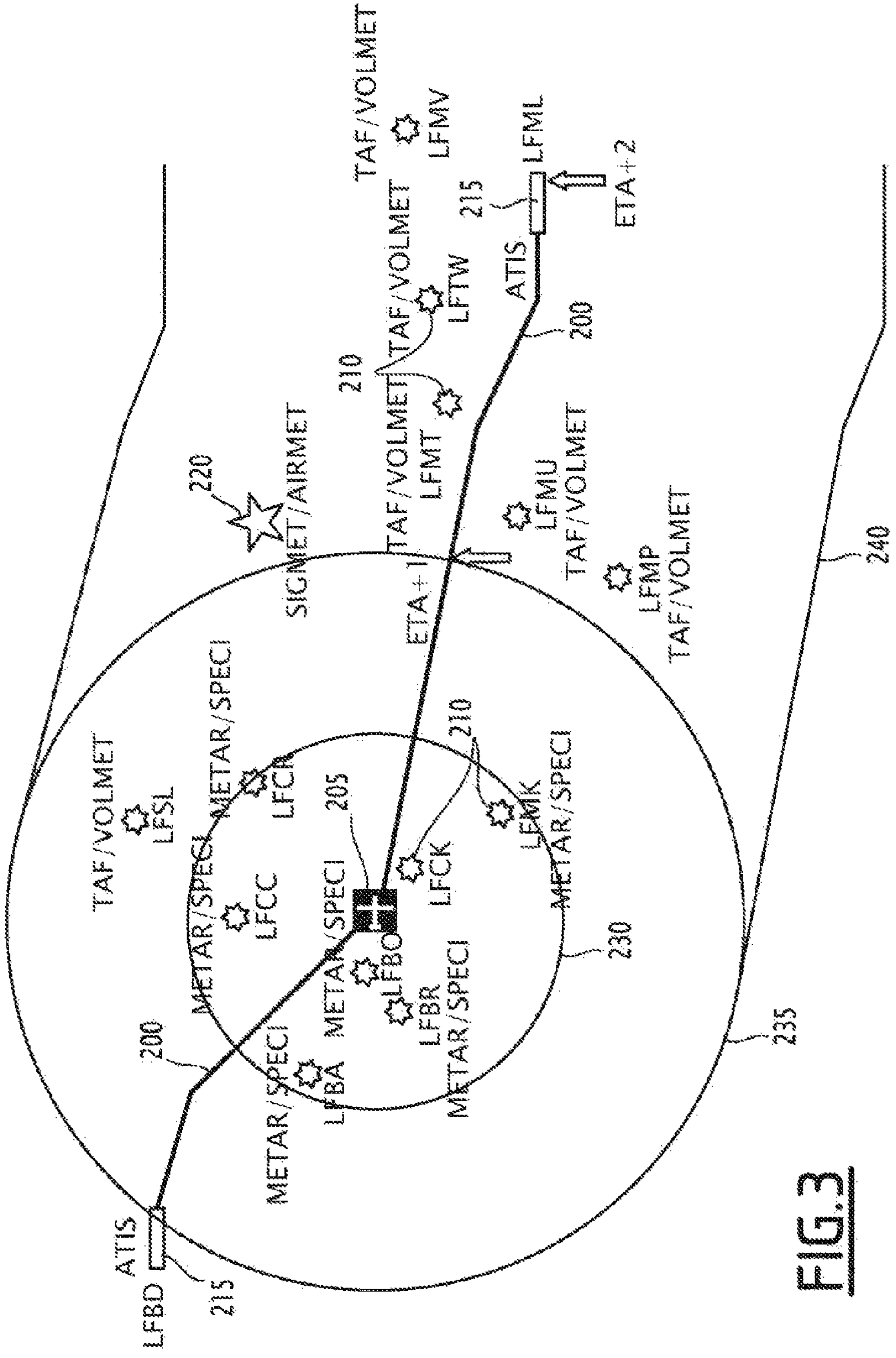
FIG. 3 is a two-dimensional illustration of search criteria for one or several mission object identifiers contained in an acquired message, the acquired message being a meteorological message or an aeronautical information message, these search criteria depending, according to a first embodiment, on the positioning of the mission object.
Figure 4:
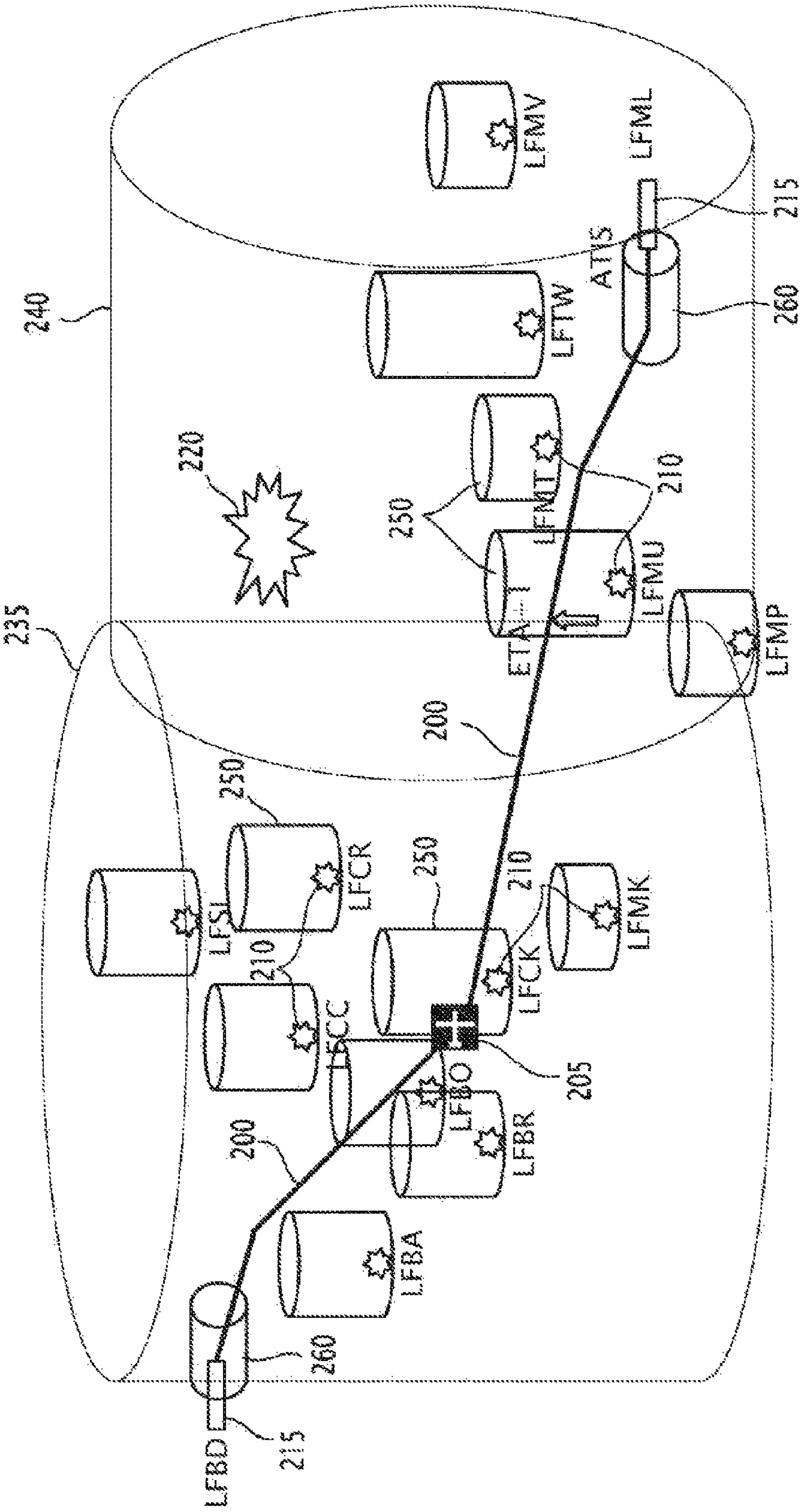
FIG. 4 is an illustration similar to that of FIG. 3, in three dimensions.

In FIGS. 3 and 4, the flight plan of the aircraft 10 is shown in the form of a broken line 200 with continuous and thick segments, and the position of the aircraft 10 is shown using an icon 205 symbolizing an airplane, FIG. 3 being a two-dimensional depiction, and FIG. 4 being a three-dimensional depiction.

Each acquired message METAR, SPECI, TAF, VOLMET is represented by a first star 210 situated in the location of the respective system 24, 28 having provided said message, furthermore with the mission object identifier corresponding to the system 24, 28 having provided said message, said identifier being in the form of a 4-letter ICAO code.

Each acquired message ATIS is represented by a first rectangle 215, also situated in the location of the ATIS system having provided the corresponding message, furthermore with the mission object identifier corresponding to the ATIS system having provided said message (LFBD, LFML, respectively, in FIGS. 3 and 4).

Each acquired message SIGMET, AIRMET is depicted by a second star 220 situated in the location of the reported significant meteorological phenomenon.

The second predefined criterion is for example the positioning of the mission object associated with the searched identifier within a cylindrical volume 230, 235 around the current position of the aircraft 10, the cylindrical volume 230, 235 extending vertically.

In FIG. 3, a first cylindrical volume 230 corresponds to the volume inside which the search step 120 is performed among the meteorological messages acquired in step 110 containing observed meteorological information, for example from among the METAR, SPECI messages.

A second cylindrical volume 235, visible in FIG. 3, corresponds to a volume inside which the search step 120 is performed among the meteorological messages acquired in step 110 containing estimated meteorological information, i.e., meteorological forecasts, for example from among the TAF, VOLMET messages. In FIG. 4, only the second volume 235 from among the first and second cylindrical volumes 230, 235 is shown to preserve clarity of the drying.

The first and second cylindrical volumes 230, 235 preferably extend vertically, and each cylindrical volume 230, 235 is for example centered radially relative to the current position of the aircraft 10. The second cylindrical volume 235 has a radius with a value higher than that of the first cylindrical volume 230.

The values of the radii of the first and second cylindrical volumes 230, 235 are for example predefined values, expressed in Nm.

Alternatively, the value of the radius of the first cylindrical volume 230 is calculated as a function of the speed of the aircraft 10, so as to correspond to a predefined flight time. As an example, the value of the radius of the first cylindrical volume 230 corresponds to a maximum flight time of 30 minutes.

Alternatively, the value of the radius of the second cylindrical volume 235 is also calculated as a function of the speed of the aircraft 10, and for example corresponds to a flight time comprised between 30 and 60 minutes.

The third predefined criterion is the position of the mission object associated with the searched identifier within at least one cylinder 235, 240 centered on at least one portion of the estimated trajectory of the aircraft 10 from its current position.

A third cylindrical volume 240, visible in FIGS. 3 and 4, is positioned around a portion of the estimated trajectory of the aircraft corresponding to a more distant temporal horizon relative to the second cylindrical volume 235. The third cylindrical volume 240 preferably extends horizontally.

The third cylindrical volume 240 corresponds to another volume inside which the search step 120 is performed among the meteorological messages acquired in step 110 containing estimated meteorological information, i.e., from among the TAF, VOLMET messages, for example.

The values of the radii of the first, second and third cylindrical volumes 230, 235, 240 can be parameterized, i.e., are configurable, so as to allow better control of communication costs.

In other words, the developing device 18 selects, as a function of the flight plan of the aircraft 10, the meteorological messages to be analyzed on an observed information criterion in a maximum radius of 1 hour (according to the frequency of the meteorological information) of flight around the current position of the airplane (validity period of the meteorological message), this corresponding to the second criterion, and a prediction information criterion beyond this radius along a tunnel, i.e., the third cylindrical volume 240, of a maximum flight time around the anticipated route, this corresponding to the third criterion.

The estimated passage time of the aircraft 10 near the corresponding systems 24, 28 is for example determined by considering a direct route toward the meteorological observation points and toward the prediction points, also called estimating points, if they are situated in the action radius of the aircraft 10. Outside this action radius and in the prediction tunnel, the passage time is that of the passage over the point situated on the path of the flight plan closest to the location of the meteorological prediction.

The SIGMET, AIRMET, SPECI, SNOWTAM, ASHTAM messages containing a significant event are also filtered in order to determine whether a special condition associated with the significant event will still be valid when flying over the point in question.

To still further improve the effectiveness of the method according to the invention, the reception module 42 is configured to obtain, from the flight management system 12, the current position and time UTC of the airplane, the flight plan, the diversion points and the estimated passage times over the points around the flight plan, and the anticipated breaks considering a direct route.

The acquisition module 40 acquires, from the communication system 14, in particular from its digital part, the valid meteorological messages, requested by the crew, sent automatically by the ground systems 24, 28, or requested by the developing device 18.

As an optional addition, the acquisition module 40 interfaces with the communication system 14, in particular its audio part, then recognizes and digitizes each ATIS, AIRMET message broadcast by radio communication.

The search module 44 then analyzes each portion of the flight plan and correlates it with the meteorological messages provided near said portion in order to select the most appropriate message (geographical and temporal validity) for this portion.

If no message is available and the aircraft has the necessary communication capacities, the search module 44 selects the available systems 24, 28 from the closest to the mission plan toward a correlation boundary defined [by] the volumes 235 and 240 and automatically requests the missing message via the communication system 14 if the system 24, 28 in question is situated within the cylinder or the prediction tunnel of the aircraft 10, as configured by the crew. The selection of the available systems 24, 28 is preferably done via a cyclical request in the following order: first, the METAR systems from the position of the aircraft 10 toward the boundary of the volume 235, then the TAF systems from the flight plan toward the boundary of the cylinder 240.

The developing module 46 lastly develops an information message having a global situation around the flight plan upon request by the pilot. The information message is for example sent to the display module 20, in order to be displayed in graphic form on the display screen, as shown in FIG. 5. Alternatively or additionally, the information message is sent to the display module 20 to be displayed in text form on a control unit, not shown. Alternatively or additionally, the information message is sent to a printer, not shown, to be printed.

As an optional addition, the display of the information message by the display module 20 is configurable by a user, such as a crew member, in order to show certain particularly relevant information, or to hide superfluous information. The pilot is thus able to control the display of this information as needed.

Figure 5:
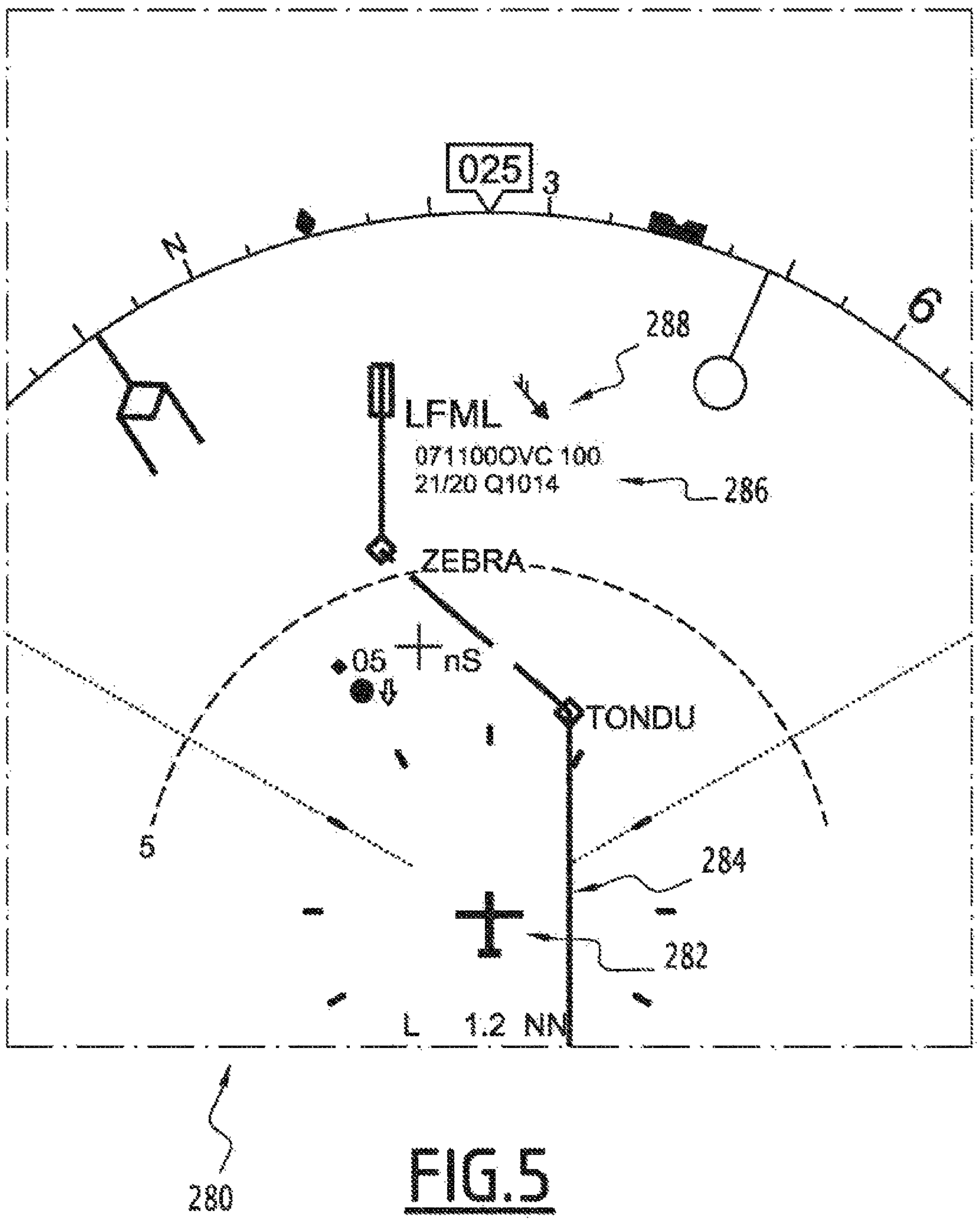
FIG. 5 is a view of information displayed according to the first embodiment.

In FIG. 5, the global situation is shown in the form of an image 280 including an icon 282 symbolizing the position of the aircraft 10, a broken line 284 symbolizing different portions of the future flight plan of the aircraft, text data 286 associated with a detected mission object identifier, the detected identifier being LFML in this example, and a stylized arrow 288, well known, providing an indication of the direction and force of the wind.

In light of FIGS. 6 to 12, the second embodiment corresponds to the implementation, during the search step 120, of the first predefined criterion. As previously indicated, the first predefined criterion is the inclusion of the searched mission object identifier both in the acquired message and in the received mission plan.

During the display step 130, each detected mission object identifier is next displayed, in the corresponding message, separately relative to the other mission object identifier(s) potentially displayed, as shown in FIGS. 6 to 12, where each detected identifier is displayed in bold and underlined.

FIG. 6 shows a view 300 of a meteorological situation map obtained using the method according to the invention, by correlation according to the first predefined criterion between the mission plan contained in table 1 below and the METAR messages contained in table 2 below.

TABLE 1

MISSION PLAN

| SCENARIO | TYPE | IDENTIFIER | ESTIMATED DATE |
|---|---|---|---|
| NOMINAL | DEPARTURE AIRPORT | LFQQ | 11:00 |
| NOMINAL | WAYPOINT | LESDO | 11:08 |
| NOMINAL | WAYPOINT | DEKOD | 11:24 |
| NOMINAL | WAYPOINT | DEPOM | 11:32 |
| NOMINAL | WAYPOINT | LMG | 11:43 |
| NOMINAL | WAYPOINT | ENSAC | 12:13 |
| NOMINAL | DESTINATION AIRPORT | LFBZ | 12:24 |
| ALTERNATIVE | ENROUTE AIRPORT | LFBI | 11:43 |
| ALTERNATIVE | ENROUTE AIRPORT | LFBL | 11:52 |
| ALTERNATIVE | ALTERNATE AIRPORT | LEBB | 12:39 |
| ALTERNATIVE | ALTERNATE AIRPORT | LFBO | 13:12 |
| ALTERNATIVE | ALTERNATE AIRPORT | LFBP | 12:31 |

TABLE 2

MESSAGES

| FORMAT | TYPE | CONTENT |
|---|---|---|
| TEXT | METEOROLOGICAL OBSERVATIONS REPORT | METAR LFAQ 101000Z AUTO 29006KT 9999 NSC 05/04 Q1010 |
| TEXT | METEOROLOGICAL OBSERVATIONS REPORT | METAR LFBA 101000Z AUTO VRB03KT 9999 FEW034 BKN068 07/05 Q1013= |
| TEXT | METEOROLOGICAL OBSERVATIONS REPORT | METAR LEBB 101030Z 30005KT 270V010 9999 FEW012 BKN032 19/17 Q1024 NOSIG |
| TEXT | METEOROLOGICAL OBSERVATIONS REPORT | METAR LFBI 101030Z AUTO 33008KT 300V020 9999 NSC 20/08 Q1021 |
| TEXT | METEOROLOGICAL OBSERVATIONS REPORT | METAR LFBL 101430Z AUTO 33006KT 9999 NSC 16/06 Q1021 |
| TEXT | METEOROLOGICAL OBSERVATIONS REPORT | METAR LFBP 101030Z 27007KT 9999 FEW007 SCT017 BKN022 17/15 Q1022 NOSIG |

TABLE 2-continued

MESSAGES

| FORMAT | TYPE | CONTENT |
|---|---|---|
| TEXT | METEOROLOGICAL OBSERVATIONS REPORT | METAR LFBO 101030Z AUTO 26011KT 240V300 9999 FEW011 SCT048 23/12 Q1020 |
| TEXT | METEOROLOGICAL OBSERVATIONS REPORT | METAR LFBZ 101030Z 29006KT 260V320 9999 FEW008 BKN012 BKN040 18/16 Q1023 NOSIG |
| TEXT | METEOROLOGICAL OBSERVATIONS REPORT | METAR LFQQ 101030Z 30016KT 9999 BKN033 SCT066 16/08 Q1017 TEMPO 4000 SHRA BKN013TCU |
| TEXT | METEOROLOGICAL OBSERVATIONS REPORT | METAR LFTH 101400Z AUTO 28005KT 9999 NSC 09/05 Q1002= |
| TEXT | METEOROLOGICAL OBSERVATIONS REPORT | METAR LFTW 101000Z AUTO 33007KT 300V360 9999 NSC 08/M00 Q1007= |
| TEXT | METEOROLOGICAL OBSERVATIONS REPORT | METAR LEBB 101000Z 00000KT 9999 FEW015 SCT030 BKN040 07/06 Q1017 TEMPO 3000 SHRA SCT020CB= |

One skilled in the art will then understand that the meteorological situation map as displayed in the view 300 of FIG. 6 includes only the METAR messages, the mission object identifier of which is also included in the received mission plan, as indicated in table 1.

The meteorological messages, such as the METAR messages, are further ranked to first display the message associated with the departure airport, then the message associated with the arrival airport, then the messages associated with the en route airports, and lastly the messages associated with the alternate airports, the different types of messages being indicated in the mission plan.

The search module 44 is then configured to find, for each object of the mission plan of the mission object type chosen for the correlation, the set of meteorological or aeronautical information whose type corresponds to the type of the aeronautical or meteorological information chosen for the correlation and for which the identifiers and mission object type correspond to those of the object of the mission plan in question.

As an optional addition, each information message includes at least one validity time range for the information and the mission plan includes time moments, also called time instants, associated with various waypoints.

The search step 120 then further includes the search, for each acquired information message, for at least one time range containing, with a predefined margin of error, at least one of the time moments contained in the received mission plan. The display step 130 then further includes the display of each detected time range, as shown in FIG. 7.

In other words, according to this optional addition, the search module 44 is then configured to find, for each object of the mission plan of the mission object type chosen for the correlation, the set of meteorological or aeronautical information whose type corresponds to the type of aeronautical or meteorological information chosen for the correlation, for which the identifiers and the mission object type correspond to those of the object of the considered mission plan, and the passage dates of which in the object in question of the mission plan correspond to the validity dates of the aeronautical or meteorological information.

Figure 7:
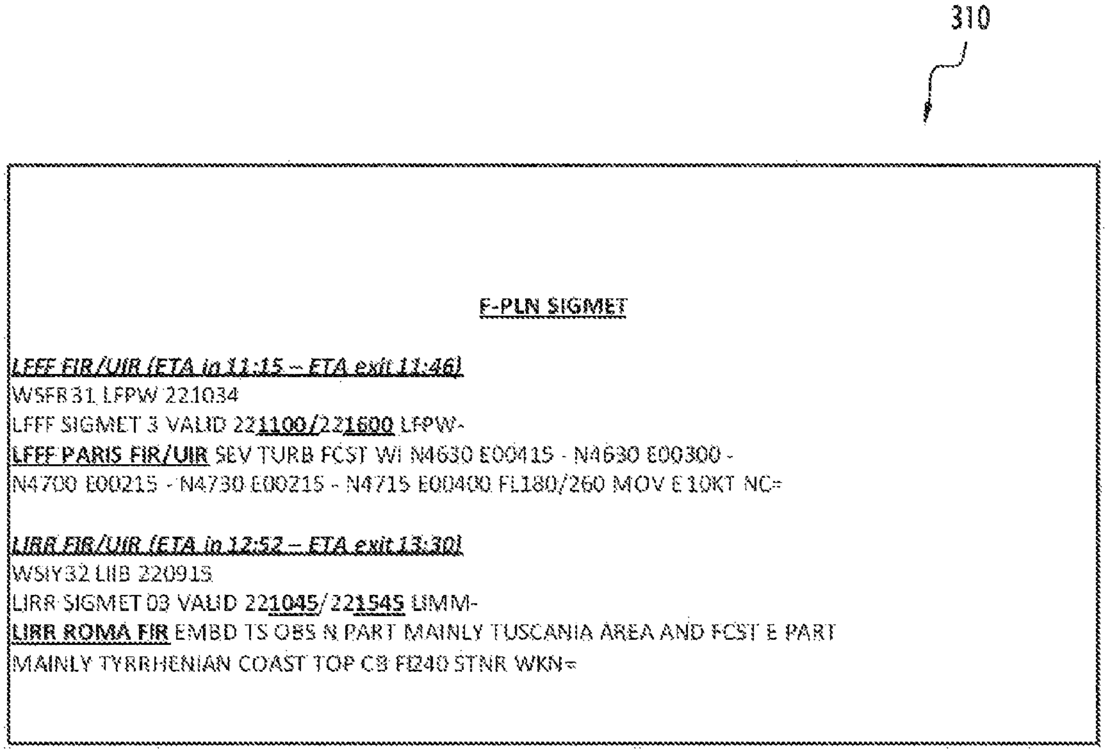

FIG. 7 shows a view 310 of a meteorological situation plan obtained by correlation according to the first predefined criterion, furthermore according to this addition, between the mission plan contained in table 3 below and the SIGMET messages contained in table 4 below.

TABLE 3

| MISSION PLAN | | | |
|---|---|---|---|
| SCENARIO | TYPE | IDENTIFIER | ESTIMATED DATE |
| NOMINAL | DEPARTURE AIRPORT | LFPO | 11:15 |
| NOMINAL | FIR/UIR | LFFF | 11:15 |
| NOMINAL | FIR/UIR | LFEE | 11:46 |

TABLE 3-continued

| MISSION PLAN | | | |
|---|---|---|---|
| SCENARIO | TYPE | IDENTIFIER | ESTIMATED DATE |
| NOMINAL | FIR/UIR | LSAG | 12:02 |
| NOMINAL | FIR/UIR | LIMM | 12:21 |
| NOMINAL | FIR/UIR | LIRR | 12:52 |
| NOMINAL | DESTINATION AIRPORT | LIRA | 13:30 |

TABLE 4

| MESSAGES | | |
|---|---|---|
| FORMAT | TYPE | CONTENT |
| TEXT | SIGNIFICANT METEOROLOGICAL FORECAST | WSDL31 EDZH 220720 EDWW SIGMET 1 VALID 220720/221000 EDZH-EDWW BREMEN FIR SEV ICE FZRA FCST S OF N5238 AND W OF E01043 SFC/1500FT STNR NC FCST 1000Z S OF N5238 AND W OF E01035= |
| TEXT | SIGNIFICANT METEOROLOGICAL FORECAST | WSIY32 LIIB 212133 LIRR SIGMET 06 VALID 212145/220145 LIMM-LIRR ROMA FIR EMBD TS FCST MAINLY TYRRHENIAN COAST TOP CB FL300 STNR WKN= |
| TEXT | SIGNIFICANT METEOROLOGICAL FORECAST | WSIY32 LIIB 220130 LIRR SIGMET 01 VALID 220145/220545 LIMM-LIRR ROMA FIR EMBD TS FCST MAINLY TYRRHENIAN COAST TOP CB FL300 STNR WKN= |
| TEXT | SIGNIFICANT METEOROLOGICAL FORECAST | WSIY32 LIIB 220527 LIRR SIGMET 02 VALID 220545/220945 LIMM-LIRR ROMA FIR EMBD TS FCST MAINLY TYRRHENIAN COAST TOP CB FL300 STNR WKN= |
| TEXT | SIGNIFICANT METEOROLOGICAL FORECAST | WSIY32 LIIB 220915 LIRR SIGMET 03 VALID 220945/221345 LIMM-LIRR ROMA FIR EMBD TS OBS N PART MAINLY TUSCANIA AREA AND FCST E PART MAINLY TYRRHENIAN COAST TOP CB FL240 STNR WKN= |
| TEXT | SIGNIFICANT METEOROLOGICAL FORECAST | WSFR31 LFPW 220352 LFFF SIGMET 1 VALID 220400/220800 LFPW-LFFF PARIS FIR/UIR SEV TURB FCST W OF LINE N5030 E00045 - N4715 E00130 FL160/240 MOV E 10KT NC= |
| TEXT | SIGNIFICANT METEOROLOGICAL FORECAST | WSFR31 LFPW 221034 LFFF SIGMET 3 VALID 221100/221600 LFPW-LFFF PARIS FIR/UIR SEV TURB FCST WI N4630 E00415 - N4630 E00300 - N4700 E00215 - N4730 E00215 - N4715 E00400 FL180/260 MOV E 10KT NC= |
| TEXT | SIGNIFICANT METEOROLOGICAL FORECAST | WSFR32 LFPW 220352 LFBB SIGMET 1 VALID 220400/220800 LFPW-LFBB BORDEAUX FIR/UIR SEV TURB FCST WI N4215 E00230 - N4230 E00045 - N4645 W00015 - N4715 W00015 - N4715 E00130 FL160/240 MOV E 10KT NC= |
| TEXT | SIGNIFICANT METEOROLOGICAL FORECAST | WSFR32 LFPW 220751 LFBB SIGMET 2 VALID 220800/221200 LFPW-LFBB BORDEAUX FIR/UIR SEV TURB FCST WI N4630 E00300 - N4230 E00230 - N4715 E00100 - N4715 E00200 - N4630 E00300 FL160/260 MOV E 10KT NC= |
| TEXT | SIGNIFICANT METEOROLOGICAL FORECAST | WSFR34 LFPW 220354 LFMM SIGMET 1 VALID 220400/220800 LFPW-LFMM MARSEILLE FIR/UIR SEV TURB OBS WI N4030 E00430 - N4200 E00430 - N4215 E00230 - N4345 E00245 - N4430 E00445 - N4130 E00715 SFC/FL050 STNR NC= |

According to another optional addition, the search module 44 is then configured to find, from among the set of aeronautical or meteorological information, as previously described, the parts of the aeronautical or meteorological information, called applicable fragments, whose validity dates correspond exactly, or with an allowance depending on the type of mission object in question, to the passage dates of the object of the mission plan associated with the aeronautical or meteorological information.

FIG. 8 shows a view 320 of a meteorological situation plan obtained by correlation according to the first predefined criterion, according to this other addition, between the mission plan contained in table 5 below and the TAF messages contained in table 6 below.

TABLE 5

| MISSION PLAN | | | |
|---|---|---|---|
| SCENARIO | TYPE | IDENTIFIER | ESTIMATED DATE |
| NOMINAL | DEPARTURE AIRPORT | LFQQ | 23-JAN-14:02 |
| NOMINAL | WAYPOINT | LESDO | 23-JAN-14:08 |
| NOMINAL | WAYPOINT | DEKOD | 23-JAN-14:24 |
| NOMINAL | WAYPOINT | DEPOM | 23-JAN-14:32 |
| NOMINAL | WAYPOINT | LMG | 23-JAN-14:43 |
| NOMINAL | WAYPOINT | ENSAC | 23-JAN-15:13 |
| NOMINAL | DESTINATION AIRPORT | LFBZ | 23-JAN-15:24 |
| ALTERNATIVE | ENROUTE AIRPORT | LFBI | 23-JAN-14:43 |
| ALTERNATIVE | ENROUTE AIRPORT | LFBL | 23-JAN-14:52 |
| ALTERNATIVE | ALTERNATE AIRPORT | LEBB | 23-JAN-15:39 |
| ALTERNATIVE | ALTERNATE AIRPORT | LFBP | 23-JAN-15:31 |
| ALTERNATIVE | ALTERNATE AIRPORT | LFBO | 23-JAN-16:12 |

TABLE 6

| MESSAGES | | |
|---|---|---|
| FORMAT | TYPE | CONTENT |
| TEXT | METEOROLOGICAL FORECAST REPORT | TAF LFLX 231100Z 2312/2418 24010KT 5000 BR OVC003 TEMPO 2312/2318 9999 NSW BKN015 BECMG 2406/2409 RA BECMG 2409/2412 18006KT |
| TEXT | METEOROLOGICAL FORECAST REPORT | TAF LFMH 231100Z 2312/2412 VRB02KT 9999 BKN040 TEMPO 2312/2315 SCT040 BECMG 2320/2322 34008KT BKN020 TEMPO 2320/2406 4000 RA OVC015 TEMPO 2406/2412 7000 -SHRA |
| TEXT | METEOROLOGICAL FORECAST REPORT | TAF LFQQ 231100Z 2312/2418 26012KT 9999 NSW BKN013 TEMPO 2313/2317 26015G25KT 3000 SHRA BKN008 BKN013CB PROB30 TEMPO 2315/2317 27020G35KT BECMG 2315/2317 29013KT BKN030 BECMG 2412/2415 20005KT |
| TEXT | METEOROLOGICAL FORECAST REPORT | TAF LFBZ 231100Z 2312/2412 30010KT 9999 FEW020 BKN065 PROB40 TEMPO 2312/2318 4000 -SHRA SCT008 BKN014TCU BECMG 2402/2405 4000 -RADZ BKN005 OVC010 TEMPO 2409/2412 27015G25KT 2000 RADZ BKN003 |
| TEXT | METEOROLOGICAL FORECAST REPORT | TAF LFBI 231100Z 2312/2412 24006KT CAVOK BECMG 2312/2314 5000 -RA BKN010 BECMG 2316/2318 30010KT 9999 BKN025 BECMG 2320/2322 BKN010 BECMG 2402/2404 3000 -RADZ BKN005 |
| TEXT | METEOROLOGICAL FORECAST REPORT | TAF LFBL 231100Z 2312/2412 24005KT 6000 BKN004 BECMG 2312/2314 NSW BKN010 BKN020 BECMG 2314/2316 5000 -RADZ BKN006 BECMG 2318/2320 30010KT 9999 BKN010 BECMG 2403/2405 3000 -RADZ BKN003 |
| TEXT | METEOROLOGICAL FORECAST REPORT | TAF LEBB 230535Z 2306/2406 28008KT 9999 SCT012 BKN030 TX14/2315Z TN06/2306Z TEMPO 2306/2312 3000 SHRA BKN025TCU TEMPO 2306/2406 3000 RA BKN012 PROB40 TEMPO 2313/2320 30015G25KT |
| TEXT | METEOROLOGICAL FORECAST REPORT | TAF LFBP 231100Z 2312/2412 23005KT 9999 SCT012 BKN025 TEMPO 2312/2321 25012KT 3000 SHRA BKN010 BKN020TCU BECMG 2321/2324 7000 RA BKN010 PROB40 TEMPO 2402/2406 4000 RA BKN006 |
| TEXT | METEOROLOGICAL FORECAST REPORT | TAF LFBO 230500Z 2306/2412 28008KT 9999 BKN030 BKN050 TEMPO 2306/2312 BKN007 BKN020 TEMPO 2313/2317 SCT015 SCT050 TEMPO 2319/2412 6000 -RA BKN015 TEMPO 2320/2324 30015G25KT |

TABLE 6-continued

| MESSAGES | | |
|---|---|---|
| FORMAT | TYPE | CONTENT |
| TEXT | METEOROLOGICAL FORECAST REPORT | TAF LFBG 230500Z 2306/2406 23003KT 0500 FG NSC BECMG 2309/2311 22010KT 9999 NSW SCT030 TEMPO 2314/2318 4000 -SHRA SCT010 BKN020TCU BECMG 24/04/2406 BKN015 BKN030 |
| TEXT | METEOROLOGICAL FORECAST REPORT | TAF LFBT 231100Z 2312/2412 26010KT 9999 FEW020 BKN040 PROB30 TEMPO 2312/2316 4000 -SHRA BKN013TCU BECMG 2318/2320 4000 -RA BKN008 OVC015 PROB40 2409/2412 2000 RADZ BKN003 |

One skilled in the art will note that the meteorological information correlated by mission object identifier appears in the order defined by the mission plan.

Figure 9:
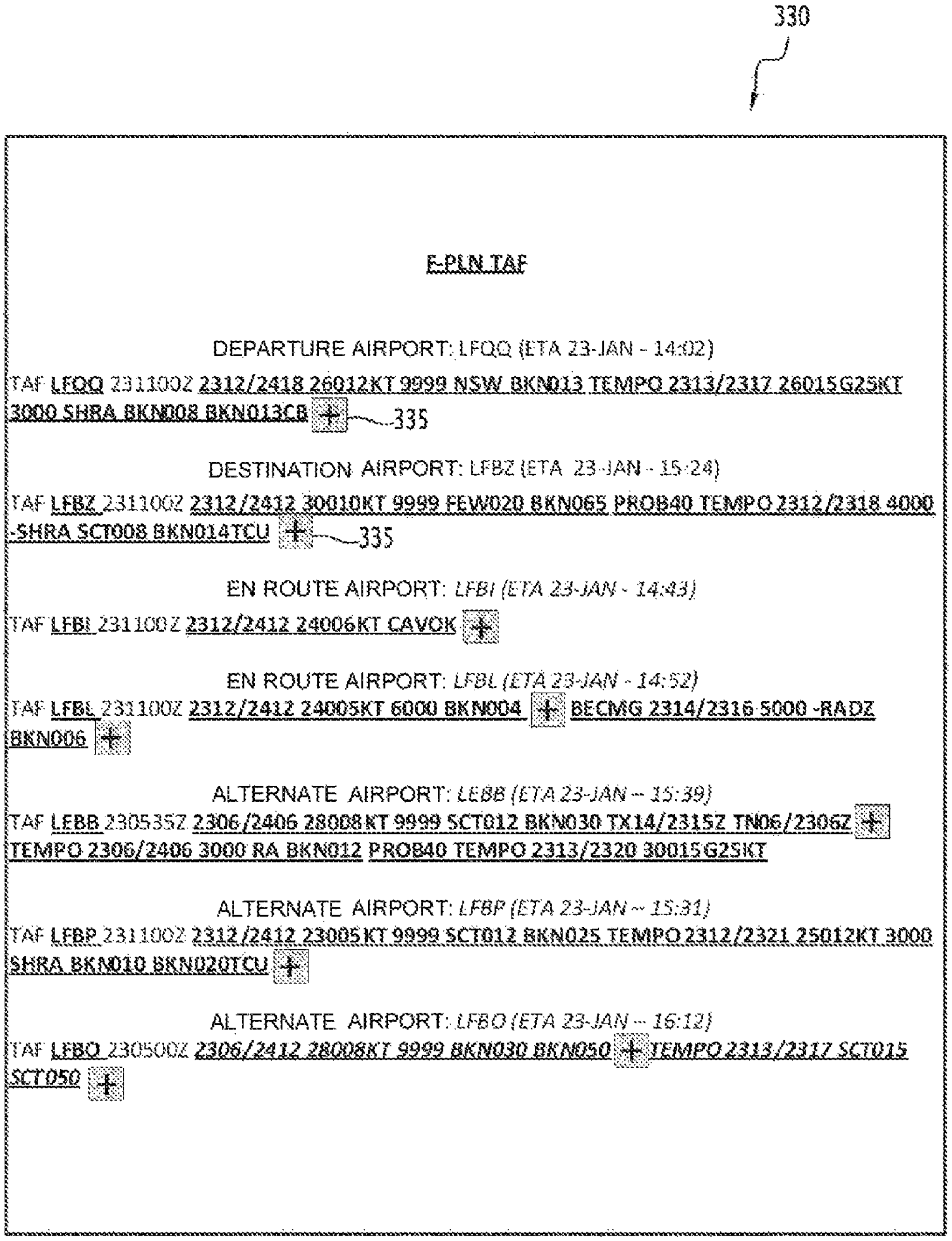
Figure 10:
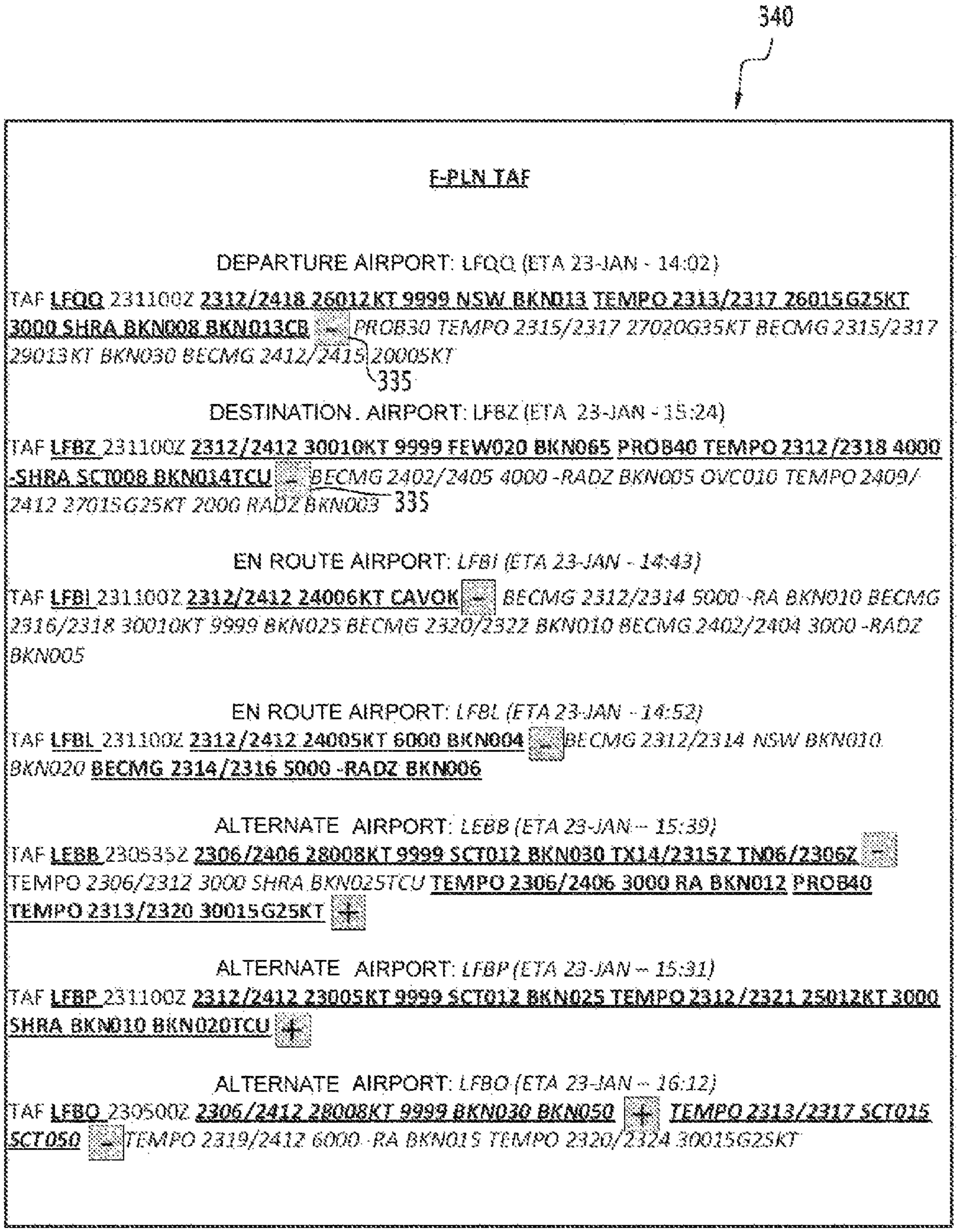

One skilled in the art will observe that the meteorological information temporally correlated by fragments is underlined in the view 320, an optional alternative being to hide it, by making it possible to display it using control buttons 335, shown in FIGS. 9 and 10 in the form of icons containing a "+" sign to display a non-correlated fragment previously hidden, a "−" sign, respectively, to hide a corresponding non-correlated fragment. When the user actuates the "+" button, the fragment of the non-correlated message appears and the "+" is replaced with a "−". If the user actuates the "−" button, the fragment of the non-correlated message is hidden, and the "−" is replaced by a "+".

The views 330, 340 respectively shown in FIGS. 9 and 10 correspond to the same mission plan and the same TAF messages as those used for the view 320 in FIG. 8, only the non-correlated fragments being hidden or not from one figure to the next. In other words, the views 330 and 340 were obtained from the mission plan contained in table 5 and TAF messages contained in table 6.

As additional examples, FIG. 11 shows a view 350 of a meteorological situation map obtained when information messages of two different types are used simultaneously, i.e., the METAR and TAF messages in this example, with the correlation according to the first criterion, without taking one of the optional additions into account.

FIG. 12 shows a view 350 of a meteorological situation map obtained when information messages of two different types are used simultaneously, i.e., the METAR and TAF messages in this example, furthermore with a different correlation from one type of acquired message to the other:

- correlation according to the first criterion, without taking one of the optional additions into account, for the METAR messages, and
- correlation according to the first criterion and with the other addition, i.e., with temporal correlation by fragments, for the TAF messages.

One skilled in the art will then understand that the different correlation alternatives described for the second embodiment are usable with acquired messages of different types, as illustrated in FIG. 11 with the METAR and TAF messages, and/or in a combined manner, by using a first correlation alternative for a first acquired message type and a second correlation alternative for a second acquired message type, as described above in the example of FIG. 12.

One can thus see that the developing device 18, the display system 22 and the display method according to the invention make it possible to facilitate the analysis, by the crew of the aircraft 10, of a received message from among a meteorological message and an aeronautical information message, such as a message of the AIS-MET type.

The invention claimed is:

1. A method for displaying information relative to an aircraft, the method being implemented by a computer and including the following steps:

- acquiring at least one message from among a meteorological message and an aeronautical information message, each message including at least one mission object identifier;
- searching, among the mission object identifier or identifiers contained in each acquired message, for at least one mission object identifier verifying at least one criterion from among first, second and third predefined criteria, the first criterion depending on a received mission plan, the second criterion depending on the current position of the aircraft, and the third criterion depending on both the current position of the aircraft and the received mission plan; and
- when at least one mission object identifier is detected verifying at least one of the first, second and third predefined criteria, displaying each detected mission object identifier.

2. The method according to claim 1, wherein each meteorological message is chosen from among the group consisting of: a METAR message, a SPECI message, a TAF message, a PIREP message, a SIGMET message, an AIRMET message and a VOLMET message.

3. The method according to claim 1, wherein each aeronautical message is chosen from among the group consisting of: an ATIS message, a NOTAM message, a SNOWTAM message and an ASHTAM message.

4. The method according to claim 1, wherein each mission object identifier is according to document ICAO 7910.

5. The method according to claim 1, wherein each mission object used for the search step is chosen from among an airport and an airspace zone.

6. The method according to claim 1, wherein the received mission plan includes mission objects, each mission object having an associated identifier; and

- during the search step, the first predefined criterion is the inclusion of the searched mission object identifier both in the acquired message and in the received mission plan.

7. The method according to claim 6, wherein, during the display step, each detected mission object identifier is displayed, in the corresponding message, separately relative to the other mission object identifier or identifiers potentially displayed.

8. The method according to claim 6, wherein each information message includes at least one time range and the mission plan includes time moments, the search step further includes the search, for each acquired information message, for at least one time range containing, with a predefined margin of error, at least one of the time moments contained in the received mission plan, and the display step further including the display of each detected time range.

9. The method according to claim 1, wherein, during the search step, the second predefined criterion is the positioning of the mission object associated with the searched identifier within a cylindrical volume around the current position of the aircraft, the cylindrical volume extending vertically.

10. The method according to claim 9, wherein the search according to the second predefined criterion is done only among the acquired meteorological message or messages containing observed meteorological information.

11. The method according to claim 10, wherein each meteorological message is chosen from among a METAR message and a SPECI message.

12. The method according to claim 1, wherein the method further comprises calculating, from the received mission plan, an estimated trajectory of the aircraft from its current position, and during the search step, the third predefined criterion is the position of the mission object associated with the searched identifier within at least one cylinder positioned around at least one portion of the estimated trajectory of the aircraft from its current position.

13. The method according to claim 12, wherein the search according to the third predefined criterion is done only among the acquired meteorological message or messages containing estimated meteorological information.

14. The method according to claim 13, wherein each meteorological message is chosen from among a TAF message and a VOLMET message.

15. A tangible, non-transitory computer-readable medium comprising a computer program product including software instructions which, when executed by a processor, cause the at least one processor to perform a method, comprising:

acquiring at least one message from among a meteorological message and an aeronautical information message, each message including at least one mission object identifier;

searching, among the mission object identifier or identifiers contained in each acquired message, for at least one mission object identifier verifying at least one criterion from among first, second and third predefined criteria, the first criterion depending on a received mission plan, the second criterion depending on the current position of the aircraft, and the third criterion depending on both the current position of the aircraft and the received mission plan; and when at least one mission object identifier is detected verifying at least one of the first, second and third predefined criteria, displaying each detected mission object identifier.

16. An electronic system for displaying information relative to an aircraft, the electronic system comprising:

an electronic developing device for developing said information relative to the aircraft, the electronic developing device comprising:

a display module for acquiring at least one message from among a meteorological message and an aeronautical information message, each message including at least one mission object identifier;

a processor for searching, among the mission object identifier or identifiers contained in each acquired message, for at least one mission object identifier verifying at least one criterion from among first, second and third predefined criteria, the first criterion depending on a received mission plan, the second criterion depending on the current position of the aircraft, and the third criterion depending on both the current position of the aircraft and the received mission plan; and a module for developing, when at least one mission object identifier is detected verifying at least one of the first, second and third predefined criteria, an information message including each detected mission object identifier; and a display module for displaying said developed information.

* * * * *